(12) United States Patent
Varadarajan et al.

(10) Patent No.: US 8,538,958 B2
(45) Date of Patent: Sep. 17, 2013

(54) SYSTEM AND METHOD FOR CONTEXT MAP GENERATION

(75) Inventors: Sridhar Varadarajan, Bangalore (IN); Srividya Gopalan, Bangalore (IN); Swetha Mukunda Kurup, Bangalore (IN); G. S. Praveen Kumar, Bangalore (IN)

(73) Assignee: Satyam Computer Services Limited of Mayfair Centre, Secunderabad (IN)

( * ) Notice: Subject to any disclaimer, the term of this patent is extended or adjusted under 35 U.S.C. 154(b) by 795 days.

(21) Appl. No.: 12/171,669

(22) Filed: Jul. 11, 2008

(65) Prior Publication Data

US 2010/0011021 A1   Jan. 14, 2010

(51) Int. Cl.
*G06F 7/00*    (2006.01)

(52) U.S. Cl.
USPC ............................ 707/732; 707/733; 707/721

(58) Field of Classification Search
None
See application file for complete search history.

(56) References Cited

U.S. PATENT DOCUMENTS

| | | | |
|---|---|---|---|
| 6,018,738 A * | 1/2000 | Breese et al. ................. | 707/749 |
| 6,169,997 B1 | 1/2001 | Papierniak et al. | |
| 7,212,314 B2 | 5/2007 | Borchers et al. | |
| 7,321,824 B1 | 1/2008 | Nesbitt | |
| 2003/0200283 A1* | 10/2003 | Suryanarayana et al. ..... | 709/219 |
| 2004/0243555 A1* | 12/2004 | Bolsius et al. ..................... | 707/3 |
| 2006/0123053 A1* | 6/2006 | Scannell, Jr. ............... | 707/104.1 |
| 2007/0016581 A1* | 1/2007 | Inoue et al. ........................ | 707/7 |
| 2007/0053513 A1* | 3/2007 | Hoffberg ...................... | 380/201 |
| 2007/0061336 A1* | 3/2007 | Ramer et al. ..................... | 707/10 |
| 2007/0067345 A1* | 3/2007 | Li et al. ...................... | 707/104.1 |
| 2007/0112838 A1* | 5/2007 | Bjarnestam et al. .......... | 707/102 |
| 2007/0162507 A1* | 7/2007 | McGovern et al. ........ | 707/104.1 |
| 2007/0233671 A1* | 10/2007 | Oztekin et al. ..................... | 707/5 |
| 2008/0162498 A1* | 7/2008 | Omoigui ......................... | 707/10 |
| 2008/0168099 A1* | 7/2008 | Skaf ........................... | 707/104.1 |

OTHER PUBLICATIONS

Cai-Nicolas Ziegler; Analyzing Correlation between Trust and User Similarity in Online Communities; 2004; Springer-Verlag Berlin; pp. 251-265.*

Einar Landre, et al., "Architectural Improvement by Use of Strategic Level Domain-Driven Design", Proceedings of OOPSLA 20 (ACM SIGPLAN International Conference on Object-Oriented Programming, Systems, Languages, and Application), Portland, USA, Oct. 2006.

Gyoungho Lee et al., "Context Map: A Method to Represent the Interactions Between Students' Learning and Multiple Context Factor", Proceedings of PERC, Aug. 2002.

(Continued)

*Primary Examiner* — Apu Mofiz
*Assistant Examiner* — Jermaine Mincey
(74) *Attorney, Agent, or Firm* — Merek, Blackmon & Vorhees, LLC (57) ABSTRACT

Personalized services and targeted services demand the exploitation of context—say, context of an environment, context of a product, context of a service, and context of a customer or user or individual. In order for the personalized and targeted services to have a greater impact, the identified context used by a context aware processing engine needs to be accurate and current. Such an up-to-date context is called as context map and a system and method for generating a customer-specific context map involves the processing of customer transactions, abstracting and generalizing these transactions into entities, and inter-relating these entities. The context map, for example, is useful in ad targeting in mobile environments, and in quicker and efficient problem resolution in contact center environments.

1 Claim, 7 Drawing Sheets

An Illustrative Context Map (56) References Cited

OTHER PUBLICATIONS

Harish Kammanahalli, et al., "CART: An Information System for Context-Aware Information Access During Synchronous Web-Based Collaborations", Proceedings of the 2nd IASTED International Conference on Communications, Internet, & Information Techology—CIIT 2003-, Nov. 17-19, 2003, Scottsdale, AZ, USA.

Harish Kammanahalli, et al., "Context Aware Retrieval in Web-Based Collaborations", Proceedings of Workshop on Context Modeling and Reasoning (CoMoRea) at 2nd IEEE International Conference on Pervasive Computing and Communication (PerCom'04), Mar. 14, 2004, Orlando, Florida.

Harish Kammanahalli, et al., "Internet Based Multimodal Collaboration Through Context-Aware Information Dissemination", Proceedings of the 8th IASTED International Conference on Internet & Mulitmedia Systems & Applications—IMSA 2004—Aug. 16-18, 2004 Kauai, Hawaii, USA.

Amit Thawani, et al., "Context Aware Personalized Ad Insertion in an Interactive TV Environment", Proceedings of TV'04: the 4th Workshop on Personalization in Future TV—Methods, Technologies, Applications for Personalized TV, in conjuction with Adaptive Hypermedia 2004, Eindhoven, The Netherlands, Aug. 23, 2004.

Anupama Kalyan, et al., "Hybrid Context Model Based on Multilevel Situation Theory and Ontology for Contact Centers", 2nd International Workshop on Context Modeling and Reasoning (CoMoRea'05) Mar. 12, 2005, in conjunction witth the Third IEEE International Conference on Penvasive Computing and Communications, PerCom 2005, Kauai Island, Hawaii, Mar. 8-12, 2005.

Anind K. Dey, et al., "Towards a Better Understanding of Context and Context-Awareness", Handheld and Ubiquitous Computing, (H.W. Gellersen, Ed.), Springer, Berlin, pp. 304-307, 1999.

\* cited by examiner

FIG. 1: AN ILLUSTRATIVE CONTACT CENTER APPLICATION OF CONTEXT MAP

FIG. 2: AN ILLUSTRATIVE AD TARGETING APPLICATION OF CONTEXT MAP

FIG. 3: AN ILLUSTRATIVE CUSTOMER ONTOLOGY

FIG. 3A: AN ILLUSTRATIVE EXTENSION TO CUSTOMER ONTOLOGY

FIG. 4: AN ILLUSTRATIVE CONTEXT MAP

FIG. 5: SYSTEM FOR CONTEXT MAP CREATION

---

ALGORITHM: CMCREATE

INPUT: CUSTOMER ONTOLOGY (CO): CONTAINS DOMAIN SPECIFIC CUSTOMER RELATED ENTITIES, RELATIONSHIPS, AND THE ANNOTATIONS (PROVIDED AS XML DESCRIPTORS)
CUSTOMER-SPECIFIC TRANS DB (CDB): CONTAINS INDIVIDUAL CUSTOMER FORMAL TRANSACTIONS;
CUSTOMER-SPECIFIC ENTITIES DB (CEDB): CONTAINS RELEVANT ENTITIES BASED ON INDIVIDUAL CUSTOMER INFORMAL TRANSACTIONS;
OUTPUT: CUSTOMER-SPECIFIC CONTEXT MAP (CM); CM IS BASED ON CO;
PROCESS:
STEP 1: SELECTION OF ENTITIES
(A) LET ECO = {E1, E2, ..., EN} BE A SET OF ENTITIES BASED ON CO
(B) ANALYZE EACH $E_i$ WITH RESPECT TO CDB AND CEDB, AND COMPUTE THE FREQUENCY OF OCCURRENCE ($M_i$);
(C) LET M = SUM ($M_i$) OVER $1 <= i <= N$;
(D) SELECT TOP K ENTITIES SUCH THAT $M_i/M$ > A PRE-DEFINED THRESHOLD AND $E_i$ IS WITHIN TOP K ENTITIES, AND FORM $ECO_k$;
STEP 2: SELECTION OF RELATIONS
(A) LET R BE A RELATION GIVEN CO; ITS XML DESCRIPTION $R_D$ PROVIDES (I) ENTITIES {E1, E2,..., ER} INVOLVED IN R; (II) ATTRIBUTES {$A_{i1}$, $A_{i2}$, ..., $A_{ix}$} ASSOCIATED WITH EACH ENTITY $E_i$ THAT ARE RELEVANT WITH RESPECT TO R; (III) EXPECTED CORRELATION AMONG ATTRIBUTES OF ENTITIES;
(B) GENERATE A TABLE $T_R$ WITH AS MANY ATTRIBUTES OF AS MANY ENTITIES INSTANTIATED AS POSSIBLE GIVEN $ECO_k$; NOTE THAT IN EACH TUPLE, SOME OF THE ATTRIBUTE VALUES MAY BE LEFT UNSPECIFIED; WHEREVER REQUIRED, NORMALIZE THE ATTRIBUTES;
(C) $R_C$ = {$C_{D1}$, $C_{D2}$, ..., $C_{DM}$} SPECIFIES MULTIPLE CORRELATIONS BASED ON INVOLVED ATTRIBUTES OF INVOLVED ENTITIES;
(D) GIVEN $R_C$ AND $T_R$, EVALUATE EACH $C_{Di}$ WITH RESPECT TO CDB AND CEDB, AND MEASURE CORRELATION COEFFICIENT $<A_{Ci}, B_{Ci}>$ WHEREIN $A_{Ci}$ IS AN ABSOLUTE MEASURE BASED ON TUPLES SATISFYING $C_{Di}$ AND TUPLES IN $T_R$ (TOTAL TUPLES SATISFYING $C_{Di}$ / TOTAL TUPLES WITH RESPECT TO $C_{Di}$ IN $T_R$); AND $B_{Ci}$ IS A RELATIVE MEASURE BASED ON $A_{Ci}$/(SUM OF $A_{Ci}$ WITH $1 <= i <= M$);
(E) AN INSTANCE OF $C_{Di}$ IS PART OF CM IF $A_{Ci}$ > A PRE-DEFINED THRESHOLD AND $B_{Ci}$ > A PRE-DEFINED THRESHOLD;

FIG. 5A: ALGORITHM FOR CONTEXT MAP CREATION

FIG. 6: SYSTEM FOR ENTITY DB CREATION

ALGORITHM: RDA

OBJECTIVE: THE MAIN OBJECTIVE IS TO GENERATE A CUSTOMER-SPECIFIC ENTITIES DATABASE FOR THE PURPOSES OF CM GENERATION; IN MANY CASES, RAW DATA MAY NOT BE DIRECTLY AMENABLE FOR TO USE IN CM GENERATION. RDA HELPS IN TRANSFORMING RAW DATA INTO PROCESSABLE TRANSACTIONS;

INPUT: CUSTOMER ONTOLOGY (CO): CONTAINS DOMAIN SPECIFIC CUSTOMER RELATED ENTITIES, RELATIONSHIPS, AND THE ANNOTATIONS (PROVIDED AS XML DESCRIPTORS)
RAW-DATA DB (RDB): CONTAINS INDIVIDUAL CUSTOMER RAW DATA; FOR EXAMPLE, IN CASE OF MOBILE ENVIRONMENT, THIS INCLUDES VOICE DATA, TEXT MESSAGE DATA, WEB INTERACTION DATA, CAMERA IMAGE DATA, AND CALENDAR DATA;

OUTPUT: CUSTOMER-SPECIFIC ENTITIES DB (CEDB) - CONTAINS RELEVANT ENTITIES BASED ON INDIVIDUAL CUSTOMER RAW-DATA TRANSACTIONS (ALSO CALLED AS INFORMAL TRANSACTIONS);

PROCESS:
STEP 1: OBTAIN A RAW-DATA TRANSACTION (ALSO CALLED AS INFORMAL TRANSACTION) FROM DB;
STEP 2: ANALYZE THE RAW-DATA TRANSACTION:
STEP 2A: CASE VOICE DATA: ANALYZE VOICE DATA AND EXTRACT KEYWORDS {KW1, KW2, ..., KWx};
STEP 2B: CASE TEXT DATA: ANALYZE TEXT DATA AND EXTRACT KEYWORDS {KW1, KW2, ...., KWy};
STEP 2C: CASE IMAGE DATA: ANALYZE IMAGE DATA AND EXTRACT KEYWORDS {KW1, KW2, ..., KWz};
STEP 3: FOR EACH EXTRACTED KEYWORD KWi;
STEP 3A: MAP KWi ONTO AN ENTITY Ej OR AN ATTRIBUTE Aj OF ENTITY Ek BASED ON CO;
STEP 3B: UPDATE A DATABASE OF ENTITY COUNTS;
STEP 4: SELECT ENTITIES FROM THE DATABASE OF ENTITY COUNTS WHOSE COUNT >= A PRE-DEFINED THRESHOLD OR WHOSE COUNT OF EACH OF THE ATTRIBUTES >= A PRE-DEFINED THRESHOLD;

FIG. 6A: ALGORITHM FOR ENTITY GENERATION

SYSTEM AND METHOD FOR CONTEXT MAP GENERATION

FIELD OF THE INVENTION

The present invention relates to context processing in general and more particularly, context processing involving individual users and customers. Still more particularly, the present invention is related to a system and method for analyzing a customer or user activities with respect to a particular domain to generate the up-to-date context of the customer or user.

BACKGROUND OF THE INVENTION

Context can be described as information that can be used for characterizing the status of an entity. The entity can be a person, place, or an object relevant for any type of interaction between user and application, including the user and the application itself. The parameters such as (a) where is the user; (b) who is the user; (c) how the user works; (d) when the activity is being done; and (e) what the user is doing are used to build a context aware environment. Typically, four things, namely, location, entity, activity, and time are defined to address the parameters for building a context aware environment.

Context-aware services, that is, services that provide customized information acquisitions and adaptations to users based on users' contextual information are attracting a lot of attention. Context-aware and situation-aware services together enhance the perceived quality of the delivered information. Context awareness provides mechanisms for developing adaptive applications and is an important aspect of interactive TV applications. A context-aware information retrieval system analyzes a user's history to derive an enhanced context. Context awareness is especially very important during coordination and collaboration. A context aware system retrieves and delivers information of high utility to a user from the point of view collaboration.

Context awareness and context modeling have raised their call for attention and importance quite recently in the world of contact centers for better customer services and relations. To address the issues of contextual reuse and contextual inconsistencies, there is a need for context models that foster context reuse and support ease of retrieving right kind of information by providing appropriate abstractions of contextual information. A hybrid context model is defined based on multi level situation theory and ontology.

The growth of digital television, over satellite, cable, as well as terrestrial networks, has driven advertisers to "better target" users by local personalized advertisements that can generate qualified leads for future sales. The advent of personal video recorders and video on demand is viewed as a threat by advertisers as they create ad-skippers. As the viewers started evading advertisements, ad agencies compete on innovative ways to ensure their ads are viewed. There is a strong need to re-work on TV advertising to create innovative features that can exploit advertisement opportunities and ad targeting is important in this scenario. Similarly, in a mobile scenario, there are excellent opportunities to target ads to enhance return on investment for the sponsors. The proposed invention addresses this need for content targeting in a variety of scenarios such as (a) web-based collaborations; (b) enterprise information retrieval; (c) mobile environments; (d) TV environments; and (e) contact centers.

DESCRIPTION OF RELATED ART

U.S. Pat. No. 7,212,314 to Borchers; Gregory E. (Vancouver, Wash.), Owen; James E. (Vancouver, Wash.) for "Context-based adaptive image processing" (issued on May 1, 2007 and assigned to Sharp Laboratories of America, Inc. (Camas, Wash.)) describes a method for context based processing of print data.

U.S. Pat. No. 6,169,997 to Papierniak; Karen A. (St. Paul, Minn.), Thaisz; James E. (Lincroft, N.J.), Chiang; Luo-Jen (Freehold, N.J.), Shah; Paresh B. (North Plainfield, N.J.) for "Method and apparatus for forming subject (context) map and presenting Internet data according to the subject map" (issued on Jan. 2, 2001 and assigned to NCR Corporation (Dayton, Ohio)) describes a method and apparatus for correlating web page files (HTML, SHTML, DHTML, or CGI files) with subject areas (such as sports, news, entertainment, restaurant, shopping, computing, business, health, family, travel, and weather) to enable the presentation of data in a format meaningful to management and business operation.

U.S. Pat. No. 7,321,824 to Nesbitt; David W. (Adamstown, Md.) for "Presenting a travel route using more than one presentation style" (issued on Jan. 22, 2008 and assigned to AOL LLC (Dulles, Va.)) describes techniques are provided for presenting a route in a manner that emphasizes the route and provides context information and in this manner, the map may both emphasize the route and provide context information for the route.

"Architectural Improvement by use of Strategic Level Domain-Driven Design" by Landre E., Wesenberg H. and Rønneberg H. (appeared in the Proceedings of OOPSLA 2006 (ACM SIGPLAN International Conference on Object-Oriented Programming, Systems, Languages, and Applications), Portland, USA, October 2006) describes the role of contexts and their relationships in analysis of encountered problems to determine the cause of the problems.

"Context Map: A method to represent the interactions between students' learning and multiple context factors" by Lee G. and Bao L. (appeared in the Proceedings of PERC, August 2002) describes a tool called context map that provides a geographical representation of the effects and interactions of multiple context factors on students' learning.

"Towards a better understanding of context and context-awareness" by Dey A. K. and Abowd G. D. (appeared in Handheld and Ubiquitous Computing, (H. W. Gellersen, Ed.), Springer, Berlin, pp. 304-307, 1999) provides a survey of a variety of context-aware computing and describes the results related to the definitions and categories of context and context-aware.

"CART: An Information System for Context-Aware Information Access during Synchronous Web-based Collaborations" by Harish K., Srividya Gopalan, Sridhar V., Krithi Ramamritham (appeared in Proceedings of the 2nd IASTED International Conference on Communications, Internet, & Information Technology ~CIIT 2003~, Nov. 17-19, 2003, Scottsdale, Ariz., USA) describes a context aware system that retrieves and delivers information of high utility to a user from the point of view collaboration (CART—Context-Aware ReTrieval).

"Context Aware Retrieval in Web-Based Collaborations" by Harish K., Srividya Gopalan, Sridhar V., Krithi Ramamritham (appeared in Proceedings of Workshop on Context Modeling and Reasoning (CoMoRea) at 2nd IEEE International Conference on Pervasive Computing and Communication (PerCom'04), Mar. 14, 2004, Orlando, Fla.) describes a context aware information retrieval system that retrieves, and presents, information of high utility to a user—taking into account the user's implicit need for information, capabilities of the user's access device, and other resource constraints of the user.

"Internet based Multimodal Collaboration through Context-Aware Information Dissemination" by Harish K., Srividya Gopalan, Sridhar V., Krithi Ramamritham (appeared in Proceedings of the 8th IASTED International Conference on Internet & Multimedia Systems & Applications ~IMSA 2004~ Aug. 16-18, 2004 Kauai, Hi., USA) describes an extended Context-Aware ReTrieval (CART) to analyze a user's history to derive an enhanced context and this is used to predict and prefetch information.

"Context Aware Personalized Ad Insertion in an Interactive TV Environment" by Amit T., Srividya Gopalan, and Sridhar V, (appeared in the Proceedings of TV'04: the 4th Workshop on Personalization in Future TV—Methods, Technologies, Applications for Personalized TV in conjunction with Adaptive Hypermedia 2004 Eindhoven, The Netherlands Aug. 23, 2004) describes an architecture for context aware real time selection and insertion of advertisements into the live broadcast stream by taking into consideration the user's current and past contextual information.

"Hybrid Context Model based on Multilevel Situation Theory and Ontology for Contact Centers" by Anupama Kalyan, Srividya Gopalan and Sridhar V. (appeared in 2nd International Workshop on Context Modeling and Reasoning (CoMoRea'05) Mar. 12, 2005—In conjunction with the Third IEEE International Conference on Pervasive Computing and Communications, PerCom 2005, Kauai Island, Hi., Mar. 8-12 2005) describes a hybrid context model based on multi level situation theory and ontology so as to enable consistent contextual reasoning. The context model is hybrid in the sense that the proposed multilevel situation theory is defined based on the entities, entity attributes, and entity relationships as described in the contact center ontology.

The known systems do not address the various issues related to the automated identification of complete contextual information about, say, users. The present invention provides a system and method for addressing these issues in order to efficiently generate contextual information for use in context-aware reasoning and processing.

SUMMARY OF THE INVENTION

The primary objective of the invention is to determine contextual information associated with a user or customer or individual.

One aspect of the invention is to use customer-specific transactions and customer-related ontology to determine customer-specific context map.

Another aspect of the invention is to use customer-specific raw transactions and customer-related ontology to determine customer-specific entities.

Yet another aspect of the invention is to use customer-specific transactions and customer-related ontology to determine customer-specific entities.

DETAILED DESCRIPTION OF THE PREFERRED EMBODIMENTS

Context map is an abstraction of the various activities performed by an individual that summarily provides the "interesting" aspects about the individual. Such a context map finds utility in multiple application scenarios: in a contact center to help resolve problems posed by the individual and in this scenario, the context map related to products and agents also play a role in the problem resolution process; in a mobile phone scenario, ad targeting is very effective when the context map of the individual is used in the targeting process; in a set-top box scenario, the context map helps in providing personalized services; and finally, in a collaboration scenario, the context map of the involved individuals are used to provide relevant information during collaboration on the shared whiteboard.

The basis for a context map is a set of transactions/activities performed by an individual. For example, in a contact center scenario, the examples transactions/activities include (a) a call by the individual to a contact center describing a problem to an agent; (b) the products/services bought/subscribed by the individual; (c) the overall products/services portfolio; and (d) the new features added to a product. Similarly, in a mobile phone scenario, the transactions/activities include (a) a voice conversation with a friend; (b) sending of a text message; (c) taking a snap using the built-in camera; and (d) browsing a web page using the mobile phone. Several of these scenarios require deep analysis of transactions and domain ontology plays an important role in this analysis. Ontology supports domain specific information and comprises of entities and relations that are needed to represent an area of knowledge. Such knowledge representation aids in exploration of information space using the entities, properties of the entities, and relation between entities.

Figure 1:
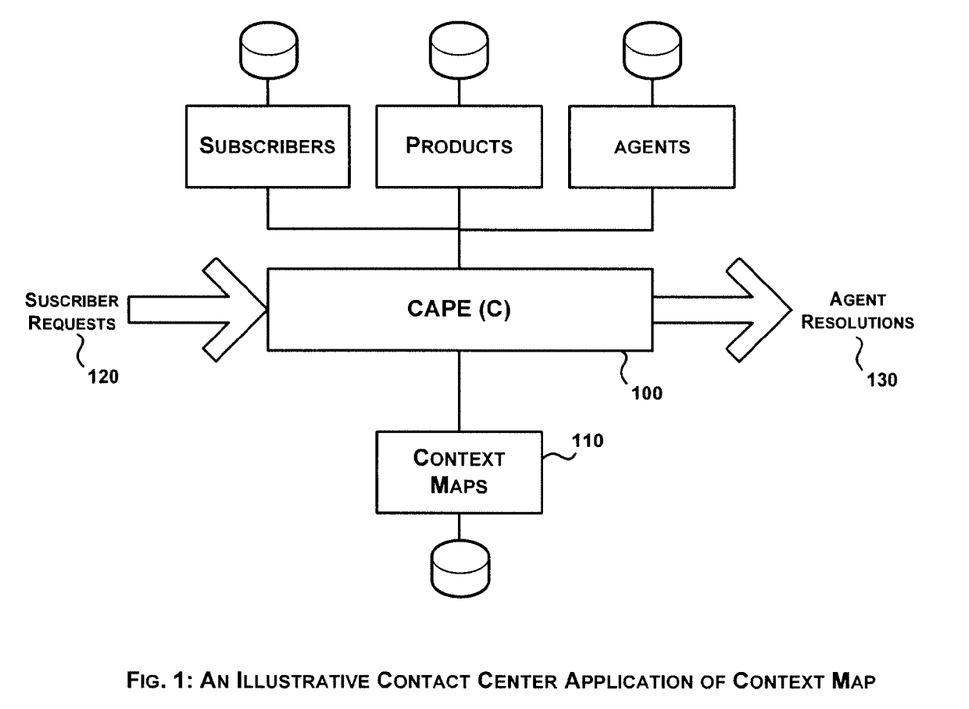
FIG. 1 depicts an illustrative contact center application of Context Map.

FIG. 1 depicts an illustrative contact center application of Context Map. CAPE(C) (100) is a context-aware processing engine that uses a multitude of context maps (110) to help reduce the call resolution time in contact centers. In particular, there are three distinct context maps: subscriber-specific, product-specific, and agent-specific. The subscriber calls to a contact center form part of subscriber transactions and analyzing these transactions with the help of domain ontology helps in the creation of subscriber-specific context map. Similarly, the product portfolios, enhancements in product features, and product-specific characteristics are analyzed using domain ontology to arrive at product-specific context maps. And finally, the analysis of the interactions of an agent with respect to calls from various subscribers using domain ontology helps in identifying agent-specific context maps. The generated context maps are used during the processing of subscriber requests (120) to determine agent resolutions (130).

Figure 2:
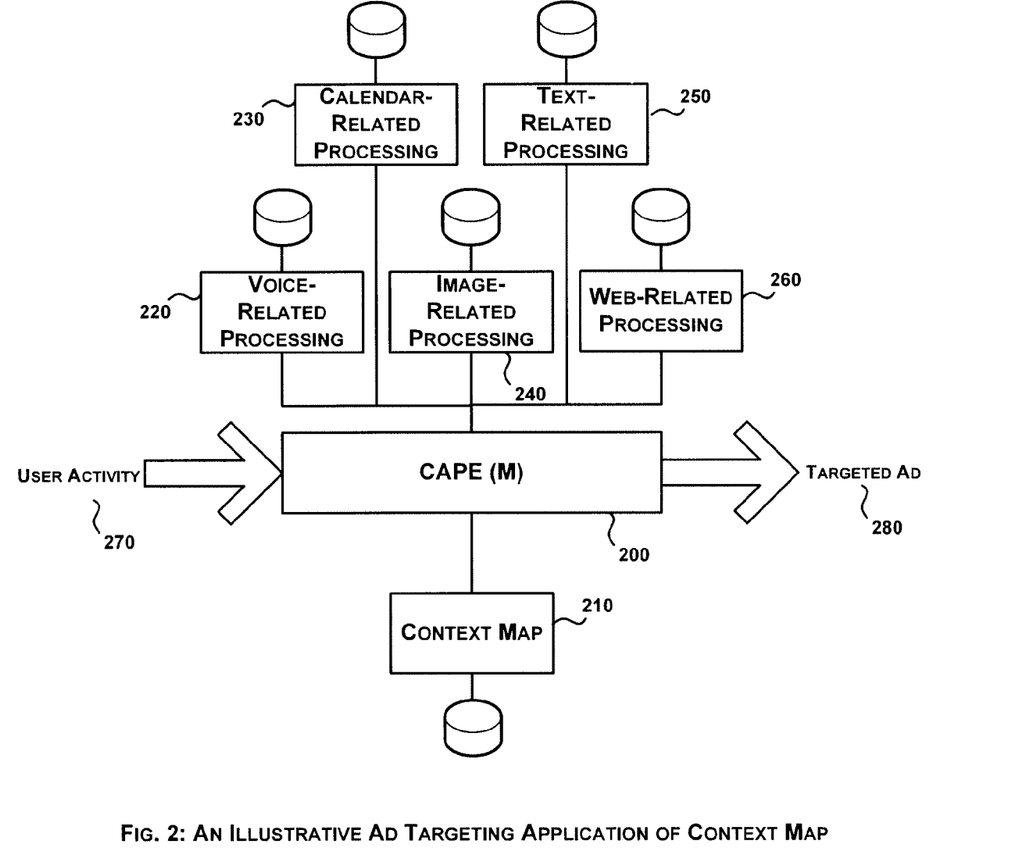
FIG. 2 depicts an illustrative ad targeting application of Context Map.

FIG. 2 depicts an illustrative ad targeting application of Context Map. CAPE(M) (200) is a context-aware processing engine that uses the user-specific context map (210) to help target the most appropriate and relevant ads during the various user activities performed by the user using a mobile phone. The user-specific context map is an abstraction of the various activities (transactions) performed by the user such as a voice call to a friend, a text message to spouse, and browsing of a web site. The various voice calls are analyzed to extract the entities of interest (220). The calendar updates are analyzed to extract the interesting entities (230). Similarly, the images taken using the built-in camera of the mobile phone are analyzed to extract the relevant entities (240) and the text messages are analyzed to extract the most appropriate entities (250). Finally, the information contained in the browsed web pages are analyzed to extract the relevant entities (260). Note that these analyses are aided by a domain-specific ontology. The extracted entities are collectively analyzed using domain-specific ontology to generate the context map and is used in targeting the right ad (280) during a particular user activity (270).

Figure 3:
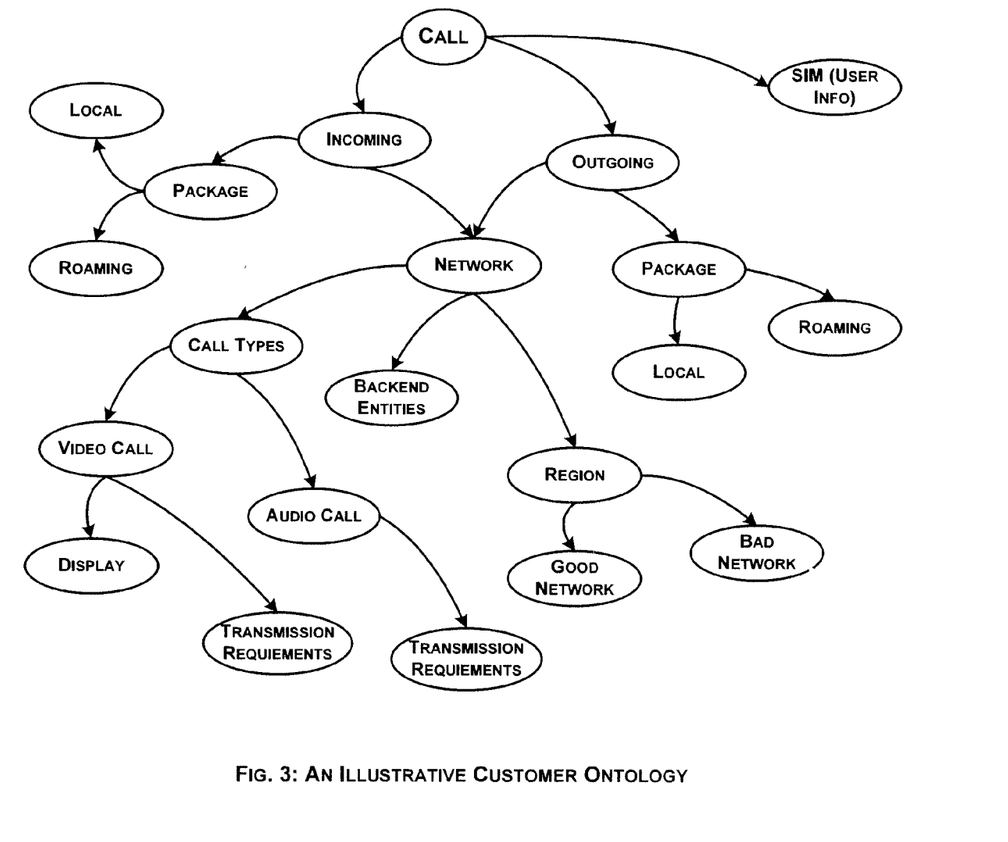
FIG. 3 depicts an illustrative Customer Ontology.
Figure 3A:
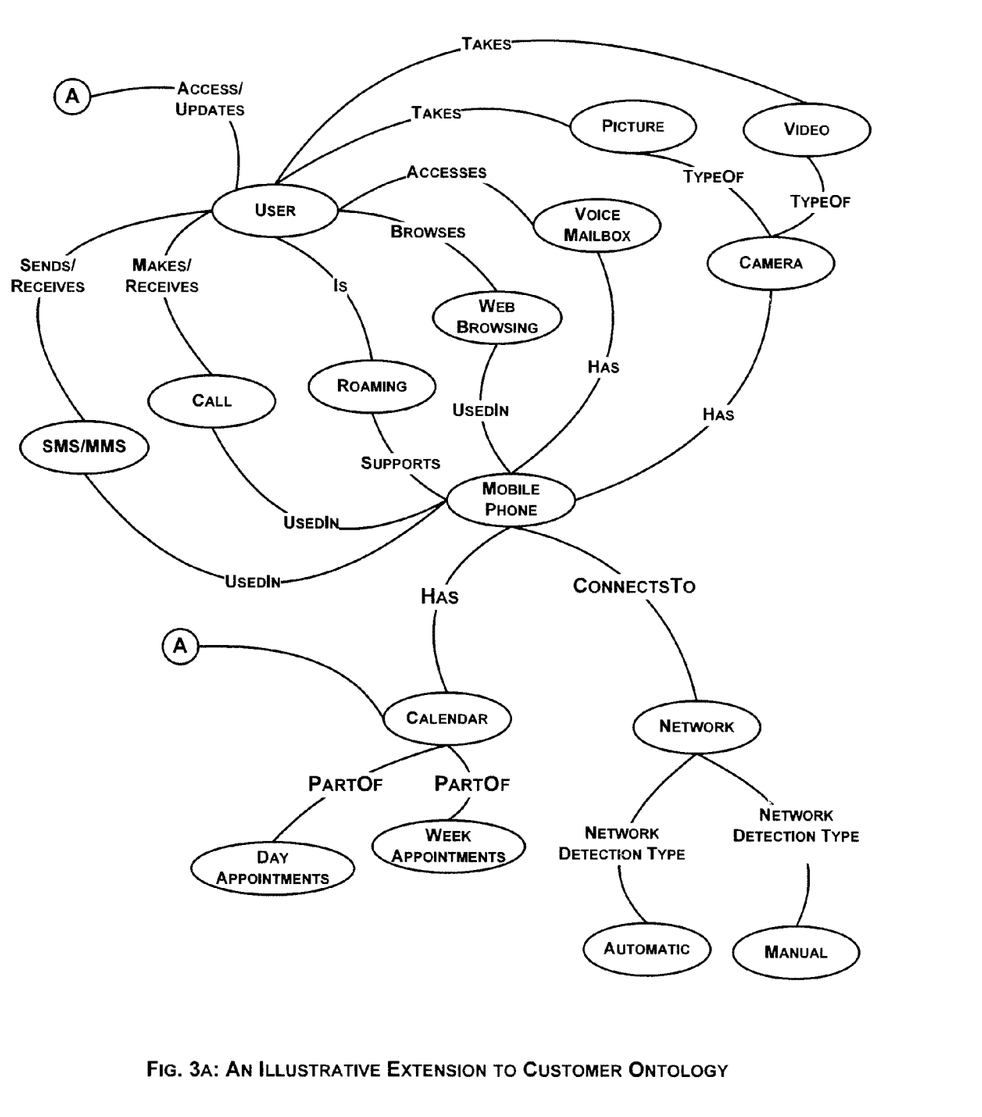
FIG. 3a depicts an illustrative extension to Customer Ontology.

FIG. 3 depicts an illustrative Customer Ontology and FIG. 3a depicts an illustrative extension to Customer Ontology. Observe that the customer ontology describes the various services available for subscription by a user, various options that are exercisable by the user, various bundled packages, various activities that could be performed by the user, and the possible detailing of these various activities.

Figure 4:
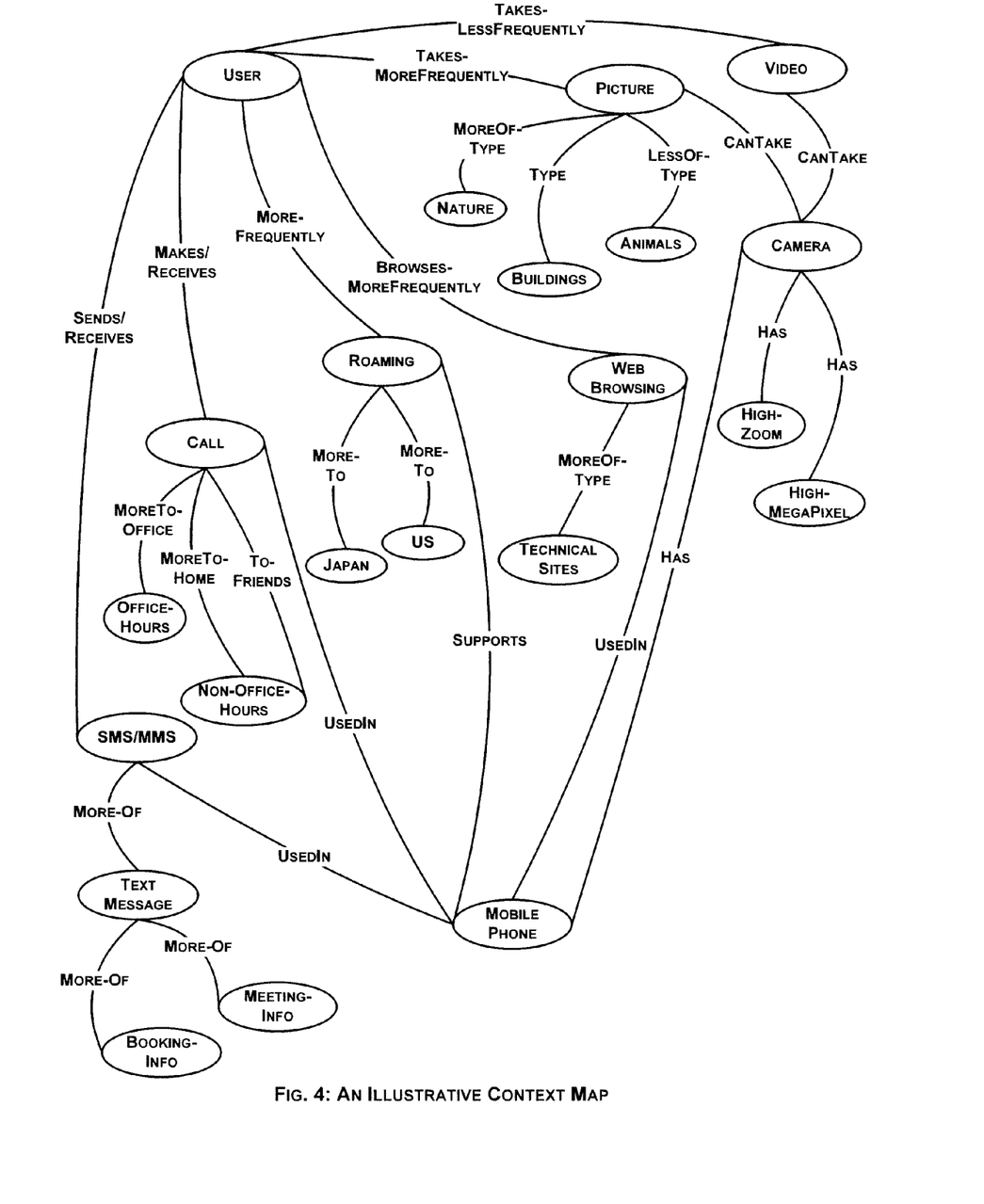
FIG. 4 depicts an illustrative Context Map.

FIG. 4 depicts an illustrative Context Map. A context map is derived by analyzing the various transactions/activities of a user and this analysis is based on one or more domain ontologies. In other words, multiple context maps are defined each with respect to a domain. Given a domain ontology, a context map derived with respect to that domain ontology has a subset of entities and relationships that form part of the domain ontology.

Further, the context map also contains derived entities that are part of the dictionary associated with the domain. Similarly, the context map also contains derived relationships that are of standard type such as MoreOf and augmented relationships such as Takes-MoreFrequently.

Figure 5:
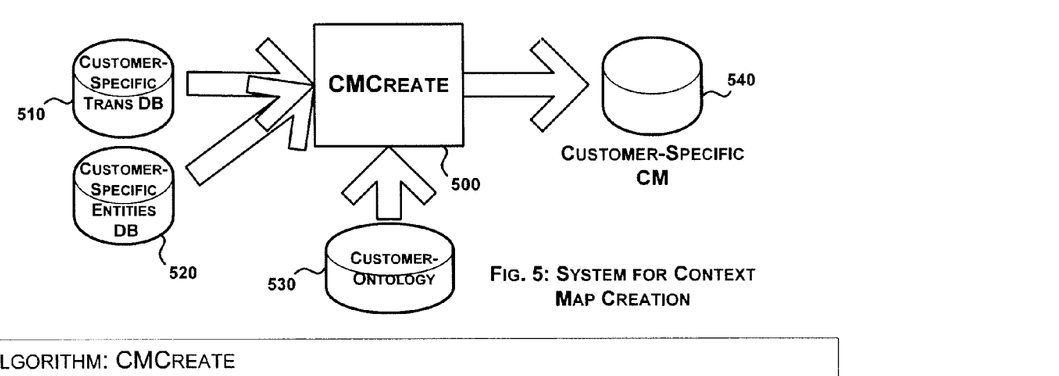
FIG. 5 depicts a system for Context Map creation.

FIG. 5 describes a system for context map creation. CMCreate (500) uses two customer-specific databases: customer-specific transaction database (510) and customer-specific entities database (520). The system, while processing data from these two databases, makes use of customer-ontology (530) to create customer-specific context map (540).

Figure 5A:
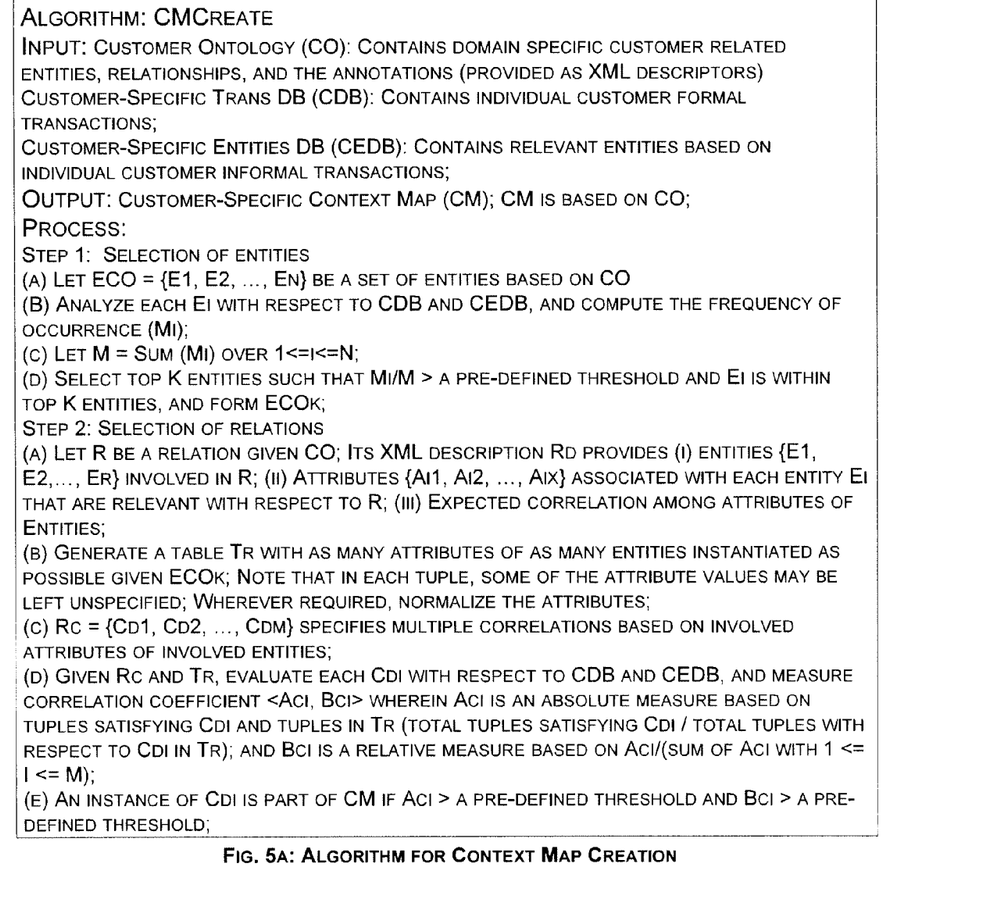
FIG. 5a provides an algorithm for Context Map creation.

FIG. 5a provides an algorithm for Context Map creation. This algorithm is part of the system for context map creation. The algorithm uses (a) Customer Ontology (CO) database (CO) that contains domain specific customer related entities, relationships, and annotations; (b) Customer-specific trans database (CDB) that contains individual customer formal transactions (such as bill paid and new service subscribed); and (c) Customer-specific entities database (CEDB) that contains relevant entities based on individual customer informal transactions (such as a voice call or a text message). The algorithm produces customer-specific context map (CM) as output. CM consists of a set of entities and the relationship among these entities. In Step 1, the entities are selected. Let $ECO=\{E1, E2, \ldots, En\}$ be a set of entities given CO (Step 1(A)). Analyze each entity Ei with respect to CDB and CEDB, and compute the frequency of occurrence Mi of Ei (Step 1(B)). Let M be the sum of various Mi's with $1<=i<=n$ wherein n is the number of entities in ECO (Step 1(C)). Select top K (a predefined threshold) entities such that for each of the selected entity Ej, Mj/M> a pre-defined threshold and Ej is within top K entities, and form ECOk based on the selected entities (Step 1(D)).

Step 2 is related to the selection of relationships. Let R be a relation given CO and its XML description Rd provides for (i) entities $\{E1, E2, \ldots, Er\}$ involved in R; (ii) attributes $\{Ai1, Ai2, \ldots, Aix\}$ associated with each entity Ei that are relevant with respect to R; (iii) expected correlation among the attributes of the entities (Step 2(A)). Generate a table Tr with as many attributes of as many entities instantiated as possible given ECOk (Step 2(B)). Note that in each tuple, some of the attributes may be left unspecified. Further, wherever required, normalize the attribute values so as to enable more appropriate correlation. Let $Rc=\{Cd1, Cd2, \ldots, Cdm\}$ specify multiple correlations based on involved entities and attributes (Step 2(C)). Note that Cdi is a relation expression and satisfying of the relation expression by a tuple in Tr implies correlation with respect to Cdi. Given Rc and Tr, evaluate each Cdi with respect to CDB and CEDB and measure correlation coefficient $<Aci, Bci>$ as follows (Step 2(D)):

Aci is an absolute measure and is defined as (Total number of tuples satisfying Cdi/Total number of tuples with respect to Cdi in Tr);

Bci is a relative measure and is defined as Aci/(sum of Aci with $1<=i<=M$) wherein M is the total number of correlations with respect to Rc.

An instance of Cdi is part of CM if Aci> a pre-defined threshold and Bci> a pre-defined threshold.

Figure 6:
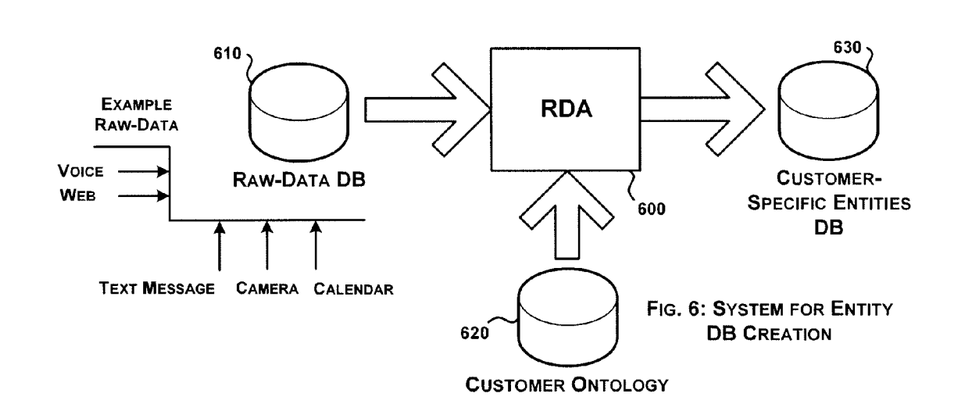
FIG. 6 depicts a system for Entities DB creation.

FIG. 6 describes a system for entities database creation. Raw-Data Analysis—RDA (600) uses a customer-specific database: customer-specific raw-data or informal transactions database (610). The system, while processing data from this database, makes use of customer-ontology (620) to create customer-specific entities database (630). The main objective is to generate a database for to be used during customer-specific context map creation. RDA helps in transforming raw-data into processable transactions.

Figure 6A:
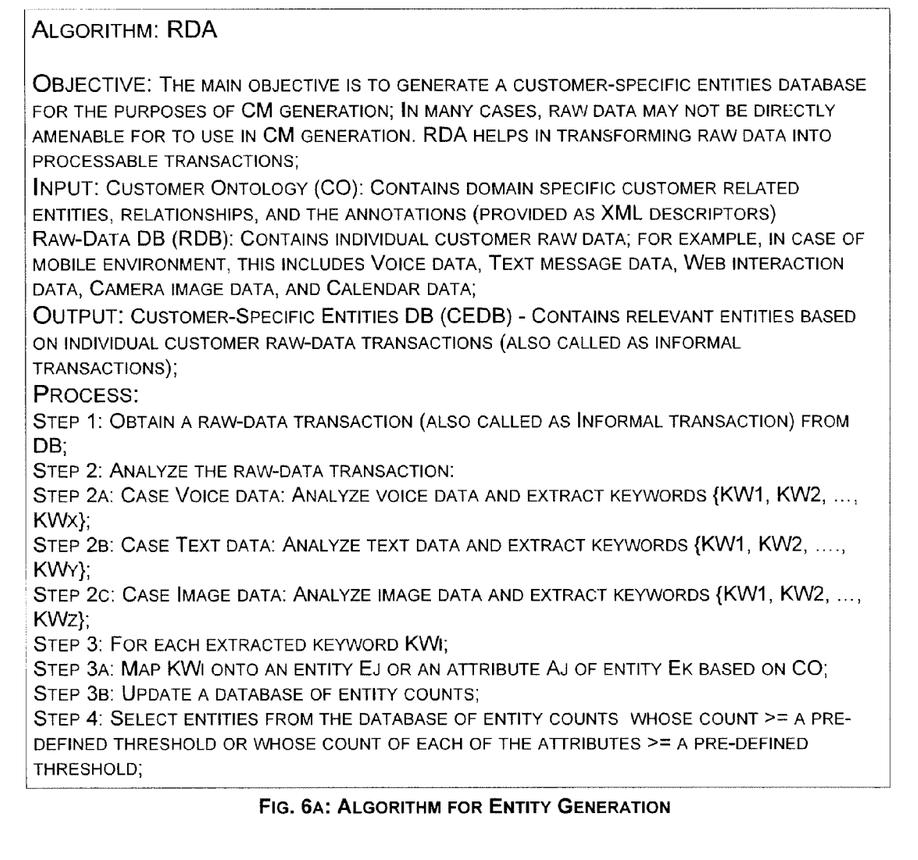
FIG. 6a provides an algorithm for Entity generation.

FIG. 6a provides an algorithm for entities database creation. This algorithm is part of the system for customer-specific entities database creation. The algorithm uses (a) Customer Ontology (CO) database (CO) that contains domain specific customer related entities, relationships, and annotations; (b) Customer-specific raw-data transactions database (RDB) that contains individual customer informal transactions (such as voice data related to voice calls and text data related to text messages). The algorithm produces customer-specific entities database as output.

Obtain a raw-data transaction (also called as informal transaction) from RDB (Step 1) and this raw-data transaction is appropriately analyzed (Step 2). In case the raw-data happens to be a voice data (say, a voice call made), an automatic speech recognition is performed on audio data to extract relevant keywords $\{KW1, KW2, \ldots, KWx\}$ (Step 2a). Similarly, in case the raw-data happens to be text data (say, obtained from a sent text message), the text is analyzed to extract keywords $\{KW1, KW2, \ldots, KWy\}$ (Step 2b). Finally, if the raw-data happens to be image data (say, an image captured using a phone camera), the image is analyzed using image processing techniques to extract keywords $\{KW1, KW2, \ldots, KWz\}$ (Step 2c). Note that in each of the above cases, customer-specific ontology play a role in the keyword extraction process. For each extracted keyword KWi (Step 3), map KWi onto an entity Ej or an attribute Aj of entity Ek based on CO (Step 3a); and a database of entity counts is suitably updated (Step 3b). Select an entity from the database of entity counts and make it part of CEDB if the update count of the entity exceeds a pre-defined threshold or the count of each of the attributes of the entity exceeds a pre-defined threshold.

Thus, a system and method for customer-specific context map creation is disclosed. Although the present invention has been described particularly with reference to the figures, it will be apparent to one of the ordinary skill in the art that the present invention may appear in any number of systems that perform customer-specific transaction analysis. It is further contemplated that many changes and modifications may be made by one of ordinary skill in the art without departing from the spirit and scope of the present invention.

What is claimed is:

1. A method for the creation of a context map with respect to a customer based on a customer ontology and a plurality of transactions of said customer, wherein said plurality of transactions comprises a plurality of keywords, said customer ontology comprises a plurality of entities and a plurality of relationships, wherein each of said plurality of relationships is among a plurality of relationship entities of said plurality of entities, said method comprising the steps of:

computing a plurality of customer related possible entities based on said plurality of entities and said plurality of keywords, wherein said means for computing further comprises:

mapping a plurality of mapped keywords of said plurality of keywords with respect to an entity of said plurality of customer related possible entities,     computing a count based on said plurality of mapped keywords, wherein said count exceeds a pre-defined threshold,     mapping a plurality of mapped attribute keywords of said plurality of keywords with respect of an attribute of a plurality of attributes of an entity of said plurality of customer related possible entities, and         computing an attribute count of a plurality of attribute counts based on said plurality of mapped attribute keywords, wherein said plurality of attribute counts is associated with said plurality of attributes and each of said plurality of attribute counts exceeds a pre-defined threshold;

computing a plurality of customer related entities based on said plurality of customer related possible entities, wherein computing further comprises:

determining a count of said plurality of counts associated with a selected entity of said plurality of customer related possible entities,         selecting said selected entity based on said count and said plurality of counts, and,         making said selected entity a part of said plurality of customer related entities;

computing a plurality of customer related relationships based on said plurality of relationships and said plurality of customer related entities, wherein a relationship of said plurality of relationships comprises a plurality of relationship entities of said plurality of entities, a plurality of entity attributes of each of said plurality of relationship entities, and a plurality of expected correlations among a plurality of entity relationship attributes, wherein said plurality of entity attributes is a part of said plurality of entity relationship attributes, wherein computing further comprises:

generating a plurality of matched entities of said relationship based on said plurality of relationship entities and said plurality of customer related entities,     computing a plurality of correlated relationships based on said plurality of relationships and said plurality of customer related entities,     computing an absolute correlation coefficient of a plurality of absolute correlation coefficients of a customer related relationship of said plurality of customer related relationships, wherein said absolute correlation coefficient is based on a plurality of tuples satisfying said customer related relationship and a plurality of tuples and a plurality of matched entities satisfying said customer related relationship and said absolute correlation coefficient exceeds a pre-defined threshold,     computing a relative correlative coefficient of said customer related relationship based on said absolute correlation coefficient and said plurality of absolute correlation coefficients, wherein said relative correlation coefficient exceeds a pre-defined threshold;

making said plurality of plurality of customer related entities a part of said context map; and     making said plurality of plurality of customer related relationships a part of said context map.

* * * * *